US007315146B2

(12) United States Patent
Bejean

(10) Patent No.: US 7,315,146 B2
(45) Date of Patent: Jan. 1, 2008

(54) BLIND DEVICE WITH ORIENTABLE SLATS

(75) Inventor: Alain Bejean, Grussy (FR)

(73) Assignee: Somfy SAS, Cluses (FR)

( * ) Notice: Subject to any disclaimer, the term of this patent is extended or adjusted under 35 U.S.C. 154(b) by 202 days.

(21) Appl. No.: 10/860,562

(22) Filed: Jun. 3, 2004

(65) Prior Publication Data

US 2005/0001574 A1 Jan. 6, 2005

(30) Foreign Application Priority Data

Jun. 10, 2003 (FR) .................................. 03 06931

(51) Int. Cl.

| | |
|---|---|
| ***G05B 5/00*** | (2006.01) |
| ***G05D 3/00*** | (2006.01) |
| ***H02H 7/08*** | (2006.01) |
| ***H02P 1/04*** | (2006.01) |
| ***H02P 3/00*** | (2006.01) |

(52) U.S. Cl. ........................ 318/468; 318/16; 318/266; 318/286; 318/466; 160/1; 160/168; 160/176; 160/310

(58) Field of Classification Search .................. 318/16, 318/266, 286, 466, 468; 160/1, 168, 176, 160/310; 200/11 TW, 549, 550

See application file for complete search history.

(56) References Cited

U.S. PATENT DOCUMENTS

| | | | | |
|---|---|---|---|---|
| 4,492,908 | A | 1/1985 | Stöckle et al. | 318/663 |
| 4,856,574 | A * | 8/1989 | Minami et al. | 160/168.1 R |
| 6,049,293 | A * | 4/2000 | Koot et al. | 340/825.69 |
| 6,259,218 | B1 * | 7/2001 | Kovach et al. | 318/16 |
| 6,333,479 | B1 * | 12/2001 | Tai | 200/550 |
| 6,571,902 | B2 * | 6/2003 | Heyne et al. | 180/321 |
| 6,619,365 | B1 * | 9/2003 | Wen et al. | 160/168.1 P |
| 6,642,459 | B2 * | 11/2003 | Chou et al. | 200/11 TW |

FOREIGN PATENT DOCUMENTS

| | | | |
|---|---|---|---|
| AU | 200072376 | A1 | 12/2000 |
| EP | 0 273 719 | A2 | 12/1987 |
| EP | 0273719 | * | 6/1988 |

* cited by examiner

*Primary Examiner*—Lincoln Donovan
*Assistant Examiner*—Erick Glass
(74) *Attorney, Agent, or Firm*—Frommer Lawrence & Haug LLP; Ronald R. Santucci

(57) ABSTRACT

The motorized blind (4) device (1) with orientable slats (5) comprises an orders transmitter (2) and an orders receiver (6) which is attached to the motorized blind, the orders transmitter (2) comprising a first control interface (2*a*) and a second control interface (2*b*). This device is one which comprises means of interpretation for differentiating between the orders to translate and to orient the slats on the basis of the actions performed on the two control interfaces, in which the second control interface (2*b*) comprises an element (14) that can be moved in two opposite senses along substantially one and the same first direction and in which two electric contacts are respectively actuatable by movement of the element (14) in the first sense and in the second sense. Such a device is simple, inexpensive, multi-purpose and its ergonomics for orienting the slats is intuitive.

16 Claims, 5 Drawing Sheets

| Control buttons | Contacts actuated | Result order to the actuator | |
|---|---|---|---|
| | | Single-motor | Twin-motor |
| 11 | 21a | Rotation 1st sense normal speed | Rotation 1st sense 1st motor |
| 12 | 21b | Rotation 2nd sense normal speed | Rotation 2nd sense 1st motor |
| 13 | 21a and 21b | STOP | STOP 1st motor |
| 14 moved according to S1 | 20a | Rotation 1st sense reduced speed | Rotation 1st sense 2nd motor |
| 14 moved according to S2 | 20b | Rotation 2nd sense reduced speed | Rotation 2nd sense 2nd motor |
| 14 moved according to S3 or to rest | 20a and 20b | STOP | STOP 2nd motor |

Fig. 8

| Control buttons | Contacts actuated | Result order to the actuator | |
|---|---|---|---|
| | | Single-motor | Twin-motor |
| 11 for t1 | 20a | Rotation 1st sense normal speed | Rotation 1st sense 1st motor |
| 12 for t1 | 20b | Rotation 2nd sense normal speed | Rotation 2nd sense 1st motor |
| 13 | 20a and 20b | STOP | STOP 1st motor |
| 14 moved according to S1 for t2 | 20a | Rotation 1st sense reduced speed | Rotation 1st sense 2nd motor |
| 14 moved according to S2 for t2 | 20b | Rotation 2nd sense reduced speed | Rotation 2nd sense 2nd motor |
| Return to rest or S3 | 20a and 20b | STOP | STOP 2nd motor |

Fig. 9

| Control buttons | Contacts actuated | Result order to the actuator | |
|---|---|---|---|
| | | Single-motor | Twin-motor |
| 11 | 20a | Rotation $1^{st}$ sense normal speed | Rotation $1^{st}$ sense $1^{st}$ motor |
| 12 | 20b | Rotation $2^{nd}$ sense normal speed | Rotation $2^{nd}$ sense $1^{st}$ motor |
| 13 | 20a and 20b | STOP | STOP $1^{st}$ motor |
| 14 moved according to S1 and S3 | 20a and 20c | Rotation $1^{st}$ sense reduced speed | Rotation $1^{st}$ sense $2^{nd}$ motor |
| 14 moved according to S2 and S3 | 20b and 20 c | Rotation $2^{nd}$ sense reduced speed | Rotation $2^{nd}$ sense $2^{nd}$ motor |
| Return to rest | 20a and 20b | STOP | STOP $2^{nd}$ motor |

Fig. 10

| Control buttons | Contacts actuated | Result order to the actuator | |
|---|---|---|---|
| | | Single-motor | Twin-motor |
| 11 | 20a | Rotation $1^{st}$ sense normal speed | Rotation $1^{st}$ sense $1^{st}$ motor |
| 12 | 20b | Rotation $2^{nd}$ sense normal speed | Rotation $2^{nd}$ sense $1^{st}$ motor |
| 13 | 20a and 20b | STOP | STOP $1^{st}$ motor |
| S1 | 20a | Rotation $1^{st}$ sense normal speed | Rotation $1^{st}$ sense $1^{st}$ motor |
| S3+S1 | 20a and 20c | Rotation $1^{st}$ sense reduced speed | Rotation $1^{st}$ sense $2^{nd}$ motor |
| S2 | 20b | Rotation $2^{nd}$ sense normal speed | Rotation $2^{nd}$ sense $1^{st}$ motor |
| S3+S2 | 20b and 20c | Rotation $2^{nd}$ sense reduced speed | Rotation $2^{nd}$ sense $2^{nd}$ motor |
| S3 | 20c | STOP | STOP $2^{nd}$ motor |

Fig. 11

BLIND DEVICE WITH ORIENTABLE SLATS

RELATED APPLICATION

The present invention claims priority from French application no. 0306931 filed on Jun. 10, 2003.

FIELD OF THE INVENTION

The invention relates to the field of sunshades and in particular to a motorized blind device with orientable slats comprising an orders transmitter and an orders receiver which is attached to the motorized blind, the orders transmitter comprising a first control interface and a second control interface.

BACKGROUND OF THE INVENTION

Interior or exterior venetian blinds, or curtains with vertical slats involve particular control constraints as compared with other sunshades such as screens, blinds, rolling shutters. Specifically, the control of the former must take account, on the one hand, of the longitudinal movement, along the height or the width of a window or a door, and, on the other hand, of the angular orientation of the slats. These sunshades require particular arrangements in order to be motorized.

A distinction is made between sunshades with orientable slats, sunshades with dual control and single-control sunshades.

DESCRIPTION OF THE PRIOR ART

Sunshades with dual control are, in the example of a nonmotorized interior venetian blind, controlled on the one hand by a string for raising and lowering the blind and, on the other hand, by a linkage mounted on the other side of the blind, to adjust the orientation of the slats. This latter control can be ensured by systems other than a linkage, such as rotary knobs, thumbwheels or sliders with magnets (in particular for the case of blinds mounted between two glazings), which make it possible to actuate, with the aid of a cable or of a rod, the rotation of the slats. A device of this type is for example disclosed in Australian patent application AU 200072376.

These systems for adjusting the orientation of the slats are intended to ensure a short angular movement and are not suitable for adjusting the height of a blind or the movement of a curtain. On the other hand, they allow fairly intuitive adjustment, suited to ergonomics in respect of the user.

In the case of single-control sunshades, a single means of control actuates the orientation and the translation of the slats.

To adjust the orientation of the slats on the basis of an intermediate halt position in the course of the raising or lowering of a blind, it is sufficient to operate the blind in the direction reverse to the previous. Single-control sunshades may be motorized more easily than dual-control sunshades. An actuator, placed in the support rail of the sunshade and generally furnished with a cord winder or belt winder, actuates the cord bearing the slats so as to orientate and/or move the latter. One then speaks of a single-motor blind.

Dual-control blinds generally require dual motorization, however. They will be referred to as twin-motor blinds.

It is not always very easy to obtain the desired orientation of the slats between the two closed positions.

This is due to the fact that the speed of rotation of the motor for orienting the slats is the same as that used for raising or lowering the blind in the case of a single-motor. The speed must be high enough for the time to raise or lower the blind to be sufficiently small. If, upon a command to orient the slats, the angular orientation of the slats is exceeded, then the motor has to be activated in the reverse sense so as to reach the desired position. Owing to the speed of rotation of the motor, the desired precise orientation is difficult to achieve on the first go.

Thus, although the control of a sunshade with orientable slats is possible with a conventional device used for other types of sunshades or other closures of the home, it is awkward.

In motorized blind systems, recourse is traditionally had to orders transmitters with one or more buttons making it possible to control the movement and the orientation of the slats according to various ergonomics.

For example, a bipolar inverter with 5 positions comprises an element tilting about an axis. Heavy pressure on one of the up or down buttons locks the element in a fixed position and triggers an order for continuous activation of the actuator in the sense instructed by this button as far as the position of limit of travel in the sense given by the button. Thus, the blind is actuated in translation (up or down). Conversely, light pressure is interpreted as a momentary order which ceases as soon as the element is released. This light pressure makes it possible to control the orientation of the slats.

This ergonomics is intuitive insofar as the lightest pressure is that which triggers the smallest movement and that the user is active in the course of orientation of the slats. On the other hand, this configuration does not make it possible to distinguish between the various controls and the inverter is not suitable for the control of twin-motor blinds.

A second exemplary orders transmitter keypad known from patent application EP 0 273 719, the content of which is incorporated by reference, comprises in addition to the up and down buttons, separate buttons for controlling the orientation of the slats in the clockwise sense and in the trigonometric sense. The buttons are then generally disposed in an aligned manner. Even if fundamentally the kinematics of orientation of the slats is obtained on the basis of activating the motor for translating the slats, the user is not aware of this.

This alignment of buttons suggests that the extra buttons as compared with the conventional up or down buttons correspond to intermediate positions. This type of transmitter offers no advantage in terms of ergonomics.

Moreover, U.S. Pat. No. 4,492,908, the content of which is incorporated by reference, discloses a device for controlling the orientation of the slats of a venetian blind comprising a potentiometer. The orientation of the slats is controlled directly as a function of the rotation applied to the potentiometer. The control of orientation is not actually intuitive insofar as it uses a correspondence with physical quantities. Its essential aim is to make it possible to correct the differences between various blinds of one and the same simultaneously controlled group so as to ensure consistency and uniform esthetic appearance. Moreover, such a control device is complicated and expensive.

SUMMARY OF THE INVENTION

The aim of the present invention is to provide control within the framework of a blind device with orientable slats alleviating the drawbacks cited and improving the known devices of the prior art. In particular, the invention proposes a blind device with orientable slats which is simple, inexpensive, which is multi-purpose (suitable for various types of motorization of blinds) and whose ergonomics of orientation of the slats is intuitive.

The device according to the invention is one which comprises means of interpretation for differentiating between the orders to translate and to orient the slats on the basis of the actions performed on the two control interfaces, in which the second control interface comprises an element that can be moved in two opposite senses along substantially one and the same first direction and in which two electric contacts are respectively actuatable by movement of the element in the first sense and in the second sense. The two electric contacts provide the power supply to an electric motor for driving the blind in two different senses.

Various embodiments of the device are defined by the dependent claims 2 to 14.

DESCRIPTION OF THE DRAWINGS

The appended drawing represents, by way of example, several embodiments of a blind device with orientable slats according to the invention.

FIGS. 8 to 11 are tables explaining the relations between control interfaces, electric contacts and reactions of the actuator(s) in various embodiments.

DETAILED DESCRIPTION

Figure 1:
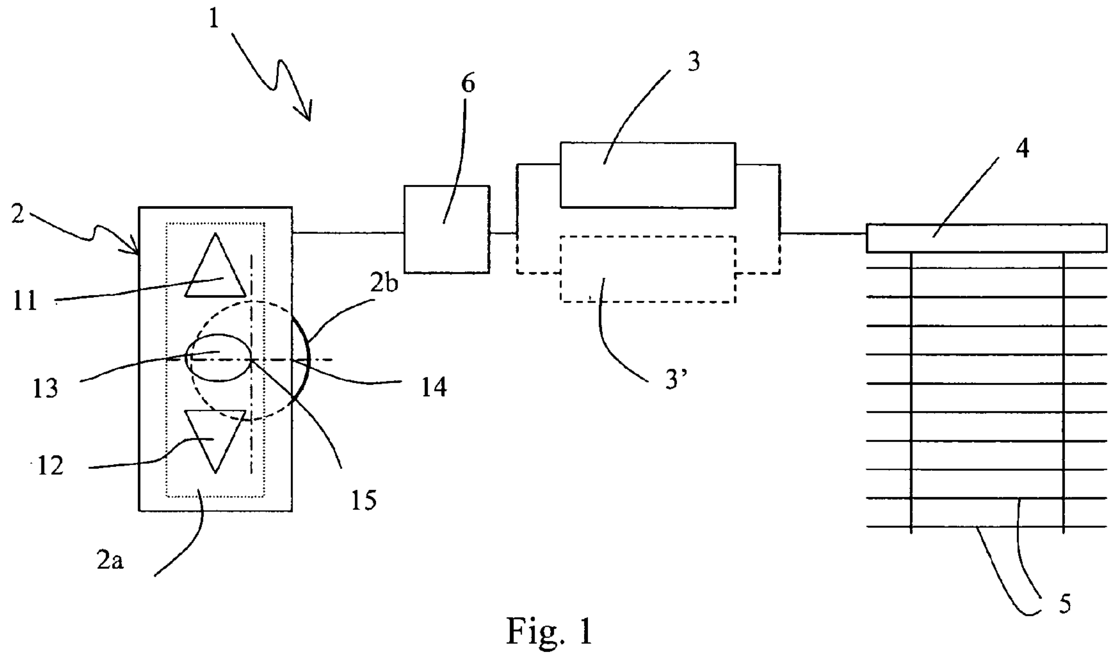
FIG. 1 is a diagram of a first embodiment of the blind device according to the invention.

The motorized blind device 1 with orientable slats represented in FIG. 1 comprises an orders transmitter 2 furnished with a first control interface 2*a* and with a second control interface 2*b*, an orders receiver 6 linked to a mechanical assembly 4 comprising horizontal slats 5 orientable about their axis, a motor 3 for orienting the slats and a motor 3' for moving the slats vertically.

Figure 2A:
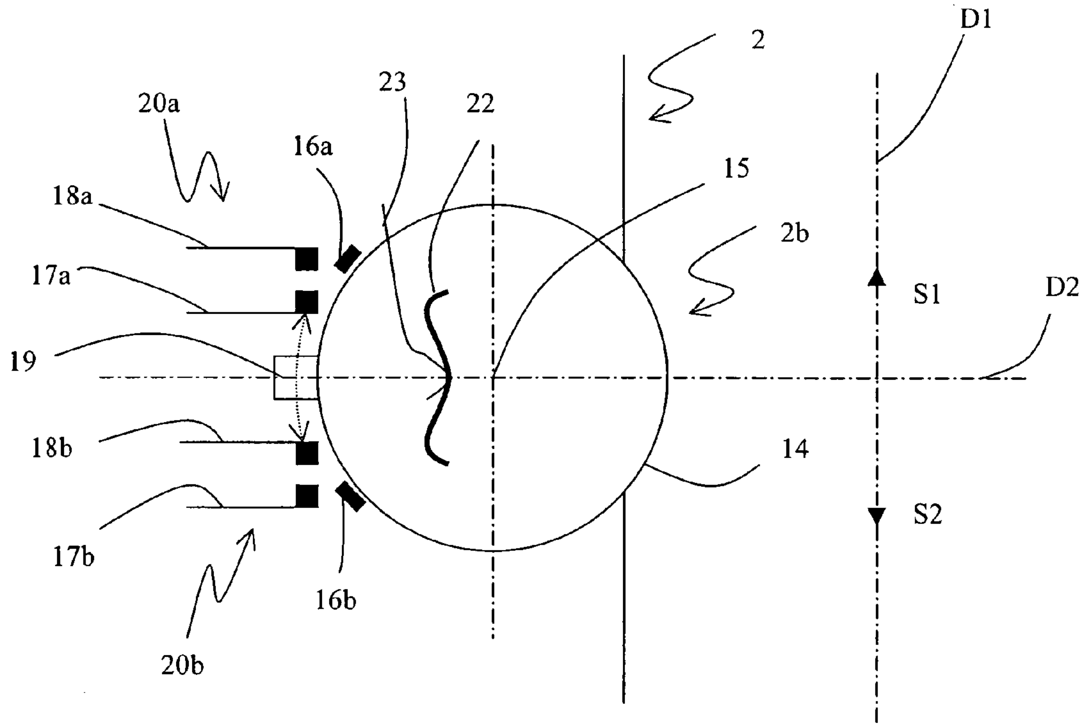
FIG. 2*a* is a view of a detail of a first embodiment of a manipulatable element of the second control interface.

The first control interface 2*a* represented in FIG. 2*a* comprises three control buttons 11, 12 and 13. The buttons 11 and 12 make it possible, in a conventional manner, to raise and lower the blind respectively by activating the motor 3'. The button 13 makes it possible to deactivate the motor 3' so as to halt the up or down motion of the blind.

The orders transmitter 2 furthermore exhibits on one of its lateral faces a second control interface 2*b* comprising a thumbwheel 14. This thumbwheel, represented in FIG. 2*a*, is moveable in rotation with respect to the face of the orders transmitter 2 about an axis 15. On its circumference it exhibits a boss 19 which makes it possible to actuate the electric contacts 20*a* or 20*b* according to the sense of movement of the thumbwheel. When the user turns the thumbwheel 14 in the clockwise sense S1, the boss 19 will act on the part 17*a* of the contact 20*a* so as to bring it into contact with its part 18*a* and thus close the contact 20*a*. When the user turns the thumbwheel 14 in the trigonometric sense S2, the boss 19 will act on the part 17*b* of the contact 20*b* so as to bring it into contact with its part 18*b* and thus close the contact 20*b*. The thumbwheel 14 is moveable between its two extreme positions in which the boss 19 abuts against a stud 16*a*, respectively against a stud 16*b*. Alternatively, the contacts 20*a* and 20*b* may themselves serve as stops.

The thumbwheel may possibly exhibit a shape 22 such as a portion of a heart cam cooperating with a spring leaf 23 acting on the latter so as to bring the thumbwheel into a position in which none of the contacts 20*a*, 20*b* is activated. This form of execution may be replaced by a system comprising one or more spiral springs for restoring to the rest position.

Figure 5:
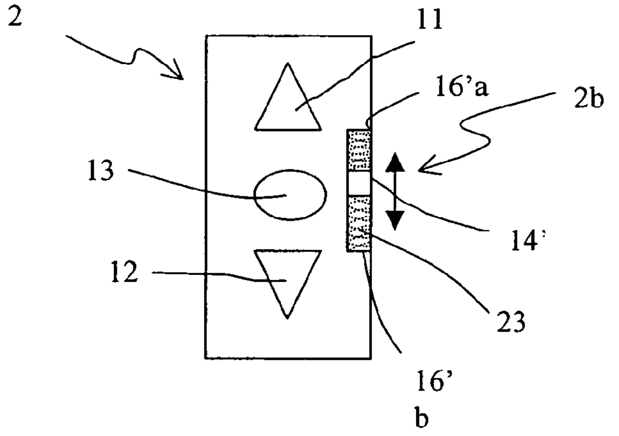
FIGS. 5 to 7 are views of details of a manipulatable element of the control interface according to variant embodiments.

The thumbwheel can be replaced as represented in FIG. 5 by another element such as a slider 14' moveable between two stops 16'*a* and 16'*b* in a groove made in the control interface 2.

One or more helical springs of low rigidity then make it possible to return the slider to its central rest position, in which the contacts 20*a* or 20*b* are not actuated.

The advantage related to the embodiments of thumbwheel or slider type is their mode of actuation: specifically, to bring the element into a limit of travel position, the motion of the element must be made to glide and be accompanied by the user. This is especially intuitive for controlling the orientation of the slats insofar as the motion is slow and monitored by the user, throughout the maneuver of orienting the slats.

In variant embodiments, the thumbwheel or the slider may remain in their limit of travel positions actuating the contacts 20*a* and 20*b* or the contacts themselves may remain in their closed position.

In these cases, in addition to the angular actuation of the thumbwheel or the translation actuation of the slider, these elements may also be actuated along a second direction D2, for example, perpendicular to the first direction of movement D1 described previously. The element then comes back to an intermediate position between its two limits of travel, in which position the contacts 20*a* and 20*b* are not actuated or the contacts regain their open position.

Figure 2B:
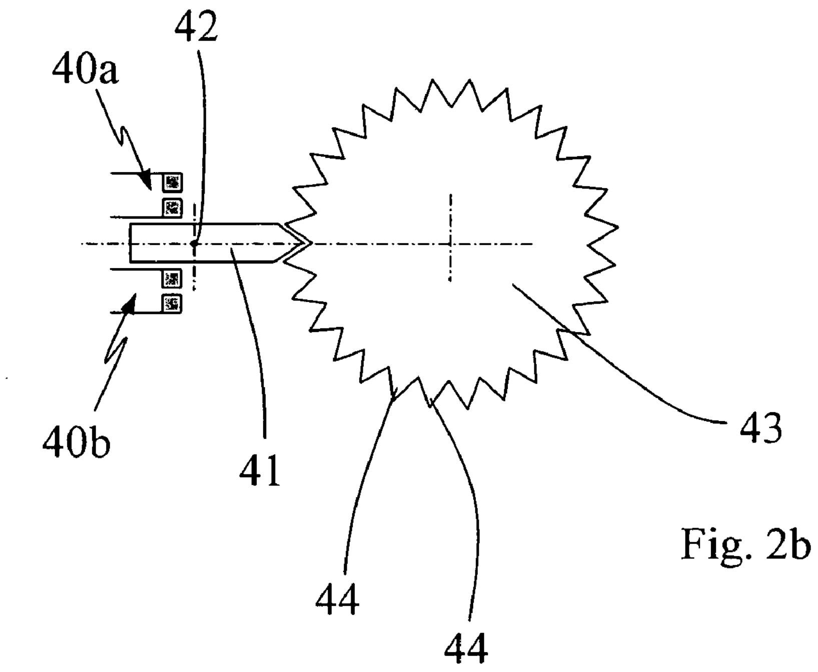
FIG. 2*b* is a view of a detail of a second embodiment of a manipulatable element of the second control interface.

In a second embodiment represented in FIG. 2*b*, the displacement of the thumbwheel 43 may also not be limited by two ends of travel, but the thumbwheel may be moved in rotation without stop. Each displacement of the thumbwheel of a certain angle (defining a displacement step of the thumbwheel) in a direction, actuates an electric contact. The actuation of a contact causes, the displacement of a step of the actuator (angle of rotation or time of actuation, for example, defined in the actuator) in the direction corresponding to that of the movement of the thumbwheel.

It is possible to transmit a control command for each displacement step of the thumbwheel. But preferably, the number of displacement steps of the thumbwheel is counted until it is stopped and then, a control command comprising the number of counted displacement steps is transmitted.

The electric contacts 40*a*, 40*b* may then be actuated by teeth 44 on the thumbwheel 43 via the rotation of a lever 41 about an axis 42.

Figure 6:
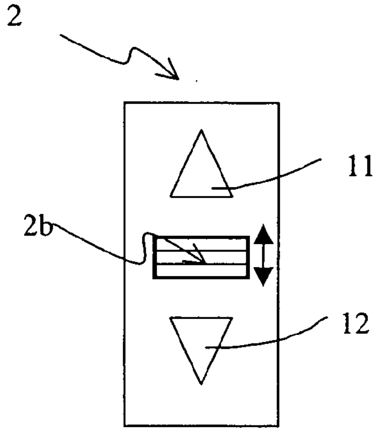
Figure 7:
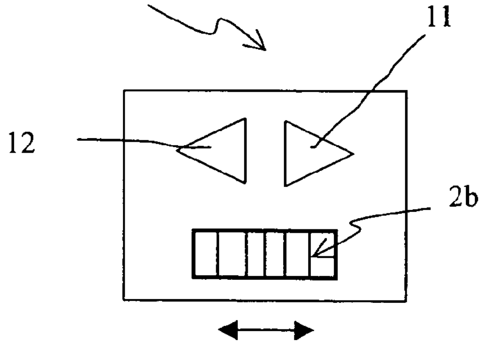

FIGS. 6 and 7 represent embodiments of orders transmitters in which the thumbwheel is disposed on the front face of the orders transmitter. In FIG. 6, the thumbwheel turns about a horizontal axis and, in FIG. 7, the thumbwheel turns about a vertical axis.

Figure 3:
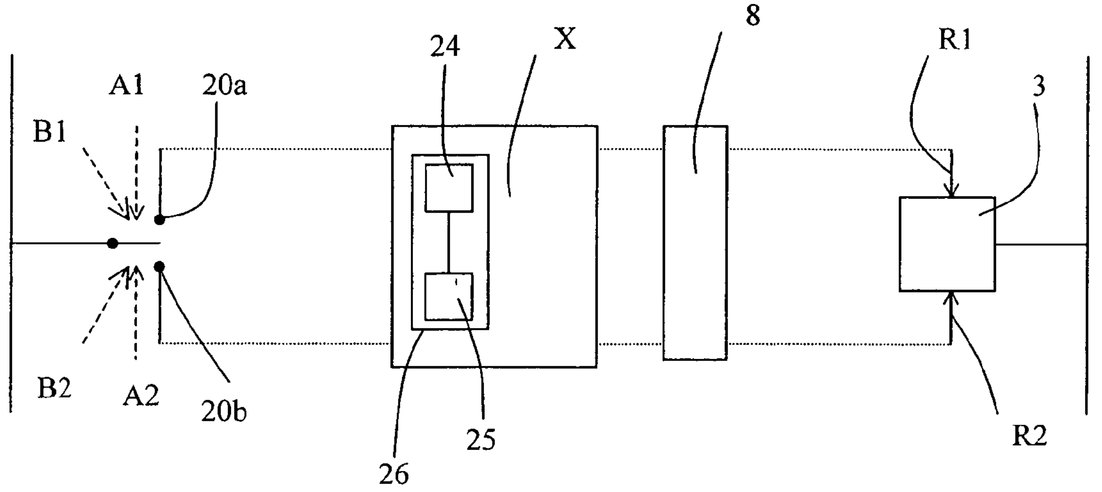
FIG. 3 is an electrical diagram of a second embodiment of the blind device according to the invention.

The actuation of the contacts 20*a* and 20*b* makes it possible to define a control order for rotating the motor in one sense or the other, as shown diagrammatically in FIG. 3. An action A1 by the user on the thumbwheel 14 in the clockwise sense S1 closes the contact 20*a*, an action A2 in the trigonometric sense S2 closes the contact 20*b*. The contacts are connected to means of interpretation X which make it possible to differentiate between the translation orders and the rotation orders. The means of interpretation X then make it possible to transmit the orders directly to the corresponding actuator or actuators.

This differentiation is important since it makes it possible to work a blind with two motors as well as a single-motor blind, while possibly reducing the latter's speed of rotation for the orientation of the slats.

The means of interpretation are generally composed of a microprocessor which makes it possible to analyze both the actuation of the electric contacts and possibly their actuation time. The interpretation means also comprise a memory. As a function of the various contacts and/or of the activation time of these contacts, the means of interpretation can determine whether it is an order to translate the slats that the user wishes to transmit or an orientation order.

The control buttons 11, 12, 13 for the up and down control of the blind can actuate contacts 21*a* and 21*b* distinct from the contacts 20*a* and 20*b*. The various contacts then serve to differentiate between the actions on the first interface and on the second interface, corresponding respectively to translation and orientation orders for the slats.

They may also actuate only the same contacts 20*a* and 20*b* as the thumbwheel 14. In this case, other means are provided for differentiating between the translation and orientation orders for the slats.

Figure 4:
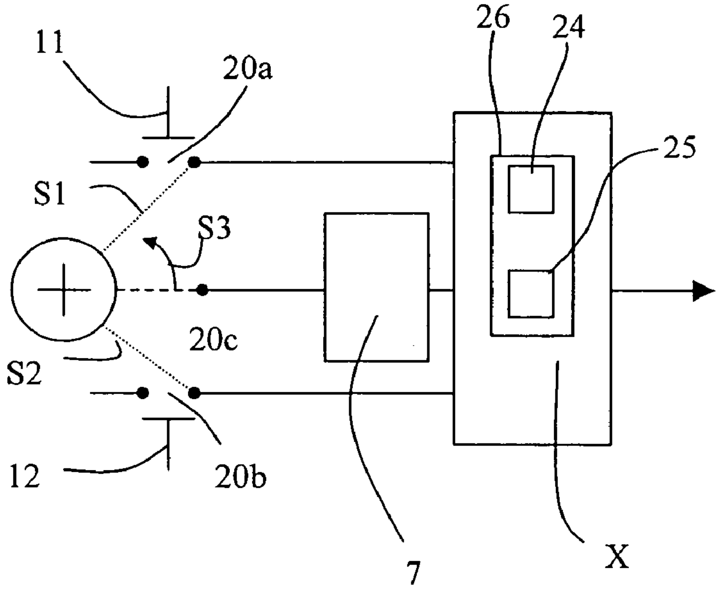
FIG. 4 is an electrical diagram of a third embodiment of the blind device according to the invention.

For example, the second interface comprises a third electric contact 20*c* linked to the thumbwheel. This third contact 20*c* can be actuated either by pressure on the thumbwheel 14 in the second direction D2, or by movement out of the rest position by manipulation of the thumbwheel 14. This embodiment is shown diagrammatically in FIG. 4. The contact 20*c* is connected to the means of interpretation X by way of a module 7 for ordering reduced speed.

Thus, the orders triggered by manipulating the thumbwheel contain information relating to the speed of the actuator, useful in the case of a single-motor blind.

The electric contact 20*c* makes it possible to differentiate between the commands input by way of the first interface and those input via the second interface.

This electric contact 20*c* may in addition have a function of controlling the stop of the rotation of the actuator and thus of controlling the stop of the up or down movement of the blind. If it is actuated when the actuator is off, it may have a function of setting the blind in an intermediate position.

Alternatively or in combination, the activation time of the control interfaces may serve to differentiate between the translation and orientation orders. In this case, the means of interpretation X comprise means 26 for differentiating between the orders comprising a detector of the activation time 24 of the control interfaces and a comparator 25 for comparing the activation time with one or more threshold values placed in memory at the level of the means of interpretation X.

Thus, even independently of the electric contacts of the two interfaces, a brief pulsed action on the first interface 2*a* may be interpreted by the means of interpretation X as a translation command for the slats, while a short-duration sustained action on the second interface 2*b* is interpreted as an orientation command for the slats. In the same way, a manipulation of the thumbwheel may also cause the transmission of a command of translation of the blind (for example at fast speed).

Each actuation of the contact 20*a* or 20*b* may generate a control command which is interpreted by the actuator as a rotation command of a defined step, even if the thumbwheel of the second interface 2*b* has ends of travel.

Various alternatives and results of the manipulations of the two control interfaces 2*a* and 2*b* are summarized in the tables of FIGS. 8 to 11.

FIG. 8 illustrates the results of the actions exerted on the various buttons of the control interfaces, in the case where the first control interface comprises electric contacts 21*a*, 21*b* and the second control interface comprises electric contacts 20*a*, 20*b*.

The table of FIG. 9 illustrates the results of the actions on the control interfaces, when the two interfaces are connected to the same electric contacts, and differentiation is effected by measuring the actuation time of these interfaces. This time is compared with a certain threshold placed in memory (at the level of the means of interpretation X). The result of the comparison makes it possible to differentiate between the translation and orientation orders.

The table of FIG. 10 illustrates the results of the actions on the control interfaces, when the two interfaces are connected to the same electric contacts and when the means of interpretation X comprise a third electric contact 20*c* actuated as soon as the thumbwheel is actuated in a sense S1 or S2, for example a contact normally open in the rest position. This third contact makes it possible to differentiate the orientation orders and to couple them with an order to reduce the speed of the actuator in the case of a single-motor device.

The table of FIG. 11 illustrates the results of the actions on the control interfaces, when the two interfaces are connected to the same electric contacts and when the means of interpretation X comprise a third electric contact 20*c* actuated as soon as the thumbwheel is actuated in a second direction distinct from the first (for example, by pressure on the thumbwheel).

A simultaneous action by pressure and movement of the thumbwheel distinguishes the control orders. A no-pressure movement of the thumbwheel corresponds to an actuation on the first control interface in the corresponding sense.

The control interface may be a wire remote control such as described previously, but it may also consist of a wireless portable remote control, communicating for example by way of radio or infrared waves with a device for powering the motor.

In this case, the various actions exerted on the various control buttons, sliders or thumbwheels are converted in the control interface by an electronic device into an electromagnetic signal.

The interpretation of the control orders may be done either at the level of the control interface, or at the level of the device for powering the motor, that is to say, the means of interpretation are located at the level of the orders transmitter or at the level of the orders receiver.

In the first case, the means of interpretation X differentiate the orders given by the user by action on one or other of the control interfaces 2*a*, 2*b*, and the orders transmitter 2 transmits a control order directly toward the orders receiver 6 of the actuator 3 or 3' concerned.

In the second case, the orders transmitter 2 transmits a set of data (for example one or more identifiers of actuated contacts, a duration of actuation) to the orders receiver 6 furnished with the means of interpretation X. These data are then analyzed by the means of interpretation X which determine therefrom the order to be given to the actuator 3, 3' concerned.

In the case of a single-motor, it is possible to couple the means of interpretation with a module for ordering a reduction in the speed of the actuator. Thus, the orientation commands for the slats may be effected at slow speed.

In an exemplary embodiment, the means of interpretation X directly trigger a command for high-speed rotation of the actuator as soon as they detect a translation command for the slats, while they trigger a command for low-speed rotation of the actuator if they detect an orientation command for the slats, this low-speed command being sustained as long as the control interface is actuated, or at least for a duration equal to the time required for the slats to tilt from one extreme position to the other extreme position, if the control interface is actuated for a greater duration.

The device according to the invention may obviously be applied to any type of blind or curtain with orientable slats.

The invention claimed is:

1. Motorized blind device with orientable slats comprising an orders transmitter and an orders receiver which is attached to the motorized blind, the orders transmitter comprising a first control interface and a second control interface, which device comprises means of interpretation for differentiating between the orders to translate and to orient the slats on the basis of the actions performed on the two control interfaces, in which the second control interface comprises an element that can be moved in two opposite senses along substantially one and the same first direction and in which two electric contacts are respectively actuatable by movement of the element in the first sense and in the second sense wherein the element is a thumbwheel mounted moveable in rotation and comprising teeth and wherein the contacts are actuated by the teeth of the thumbwheel.

2. The device as claimed in claim 1, wherein the element is mounted moveable between two stops and wherein the contacts are actuated at the level of the limits of travel of the element.

3. The device as claimed in claim 2, wherein the element is a thumbwheel or a slider.

4. The device as claimed in claim 1, which device comprising a third electric contact actuatable by manipulation of the second interface.

5. The device as claimed in claim 4, wherein the third electric contact is actuatable by manipulation of the element in a second direction.

6. The device as claimed in claim 5, wherein the second direction is substantially perpendicular to the first direction.

7. The device as claimed in claims 4, wherein the means of interpretation comprise means for differentiating between translation and orientation orders as a function of the actuation of the third electric contact.

8. The device as claimed in claim 1, wherein the means of interpretation comprise means for differentiating between translation and orientation orders as a function of the control interface actuated.

9. The device as claimed in claim 1, wherein the means of interpretation comprise means for differentiating between translation and orientation orders as a function of the duration of actuation of the control interfaces.

10. The device as claimed in claim 1, wherein the means of interpretation comprise means for differentiating between translation and orientation orders as a function of the duration of actuation of the electric contacts.

11. The device as claimed in claim 1, wherein the means of interpretation are included at the level of the orders transmitter or of the orders receiver.

12. The device as claimed in claim 1, which device comprises a single actuator for the translation and orientation of the slats.

13. The device as claimed in claim 12, wherein the means of interpretation are coupled with a module for ordering a reduction in the speed of the actuator.

14. Motorized blind device with orientable slats comprising an orders transmitter and an orders receiver which is attached to the motorized blind, the orders transmitter comprising a first control interface and a second control interface, which device comprises means of interpretation for differentiating between the orders to translate and to orient the slats on the basis of the actions performed on the two control interfaces, in which the second control interface comprises a movable thumbwheel that can be rotated in two opposite senses along substantially one and the same first direction so that each displacement of a certain angle of the thumbwheel causes an orientation displacement step of the slats.

15. The device according to claim 14, wherein the thumbwheel can be moved with a plurality of displacement steps, a control command being transmitted for each displacement step.

16. The device according to claim 14, wherein the thumbwheel can be moved with a plurality of displacement steps, a control command being transmitted and comprising the counted number of displacement steps.

* * * * *